Patented Aug. 14, 1945

2,382,684

UNITED STATES PATENT OFFICE 2,382,684

RUBBERLIKE POLYMERIC MATERIALS AND METHOD FOR PRODUCING THE SAME

Herbert W. Walker, Woodstown, N. J., assignor to E. I. du Pont de Nemours & Company, Wilmington, Del., a corporation of Delaware No Drawing. Application June 19, 1942, Serial No. 447,666

16 Claims. (Cl. 260—92.7)

This invention relates to rubber-like polymeric materials derived from 1,3-dienes and to a method for obtaining these polymers in plastic and readily processed form. More particularly, it relates to polymerization of 1,3-dienes in the presence of diazonium salts.

Many patents have been directed toward obtaining plastic polymers of dienes such as 1,3-butadiene and of chloroprene (2-chloro-1,3-butadiene), using the technically advantageous process of polymerizing in aqueous dispersions. A number of practical processes for obtaining this result have been developed. Almost all of these processes, however, in which products of high plasticity are formed involve the use of sulfur or a reduced sulfur compound, such as an organic mercaptan or hydrogen sulfide and, hence, the resulting plastic product contains chemically combined sulfur. This is a disadvantage for certain applications, for example, when the material is to be used in contact with metals which readily form sulfide under these conditions.

It is, therefore, an object of the present invention to prepare new plastic 1,3-diene polymers, in aqueous emulsion. A further object is to prepare plastic polymers which are free from sulfur.

These objects may be accomplished by polymerizing 1,3-dienes in acid aqueous emulsion in the presence of diazonium salts or of compounds which readily yield these under the conditions of the polymerization.

In order that the process may be more fully understood, the following specific examples are given by way of illustration, but the invention is not limited thereto as will become more apparent hereinafter.

Example I

One hundred (100) parts of chloroprene was emulsified in 250 parts of water containing 0.66 part of paranitrobenzene diazonium chloride, $NO_2C_6H_4N_2Cl$, (corresponding to 0.1 part calculated as group —$N_2$—), 1 part of 37 per cent hydrochloric acid, 6 parts of the sodium salts of sulfated oleyl acetate, 0.5 part of ammonium persulfate and 1 part of the sodium salts of the dinaphthyl methane sulfonic acids prepared according to U. S. Patent No. 1,336,579. The dispersion was kept at 30° C. for 13 hours while polymerization took place. The dispersion was then treated with 1 part of an antioxidant consisting of a mixture of phenylalphanaphthylamine and diphenylamine (dispersed in a solution of the above sodium salts) and then coagulated by the addition of sodium chloride and alcohol. The resulting coagulum was washed with water on a rubber mill with corrugated rolls to remove the dispersing agents and was then dried in the usual manner by milling on a rubber mill with smooth rolls warmed to approximately 50° C. The yield was 83 per cent. The product was plastic and readily milled and showed good coherence while being washed.

Example II

A mixture of 75 parts of butadiene and 25 parts of styrene were polymerized in the presence of 2.2 parts of the compound

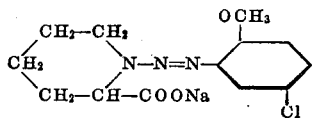

obtained by diazotizing p-chloro-o-anisidine and coupling it with the sodium salt of alpha-carboxy-piperidine. This correspond to 0.2 part calculated as —$N_2$— group. The dispersing agent was 8 parts of the product obtained by condensing propylene oxide with the sodium salts of alpha-dimethyl-amino-stearic acid and 1 part of the sodium salts of the dinaphthyl methane sulfonic acids referred to in Example I. Acetic acid (1.2 part) and ammonium persulfate (0.5 part) were also present. The polymerization was carried out in sealed glass tubes which were rotated end for end at 40° C. for 65 hours. Coagulating, washing, and drying, as described in the preceding example, gave a yield of 97 per cent of a product showing an improvement in plasticity and working properties similar to that obtained in Example I. When the same procedure was followed without the diazo reagent, the yield was 81 per cent of a much less plastic product.

As stated above, the compounds used according to this invention to produce plastic polymers can be either diazonium salts or compounds which yield diazonium salts under the conditions of the polymerization. When the diazonium salt is fairly stable, it can be added as such to the compound to be polymerized, as in Example I. Any compound or combination of compounds capable of furnishing a diazonium salt under the polymerizing conditions, can be used, such as, for example, the mixture of amine salt and nitrous acid or its equivalent. It is preferred, however, to use a product obtained by coupling a diazonium salt with, preferably, a secondary amine and to regenerate the diazonium salt therefrom by having present in the polymerizing emulsion an excess of acid over that required for the complete formation of the diazonium salt as in Example II. The amines used for coupling with the diazo compounds can be either aliphatic or aromatic and can be of a great variety of types as illustrated in the following list. The aromatic nuclei of the diazonium salt can be either benzene or naphthalene or higher polycyclic group and can have one or more of their hydrogens substituted by a hydrocarbon group (either aliphatic or aromatic) or by halogen, hydroxy, mercapto, nitro, sulfo, and carboxy groups and the like and by derivatives of such groups such as methoxy, methyl amino, and carboethoxy.

p-Sulfobenzene diazonium chloride

Aniline diazotized and coupled to dicyandiamide

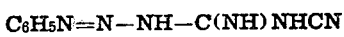

p-Chloro-o-anisidine diazotized and coupled to 4-sulfo-2-amino-benzoic acid

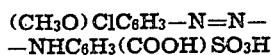

m-Nitro-p-toluidine diazotized and coupled to taurine

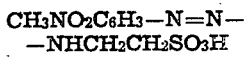

2,5-dimethoxy aniline diazotized and coupled to diethanolamine

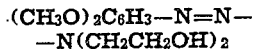

Aniline diazotized and coupled to dimethyl amine

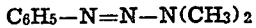

m-Chloroaniline diazotized and coupled to sarcosine

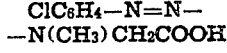

m-Chloroaniline diazotized and coupled to methyl glucamine

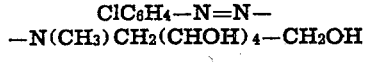

The quantity of diazonium compounds used is conveniently calculated in terms of weight of the $-N_2-$ group. Thus, the preferred proportions are from 0.05 to 0.5 per cent of this group based upon the total weight of polymerizable materials involved, although both higher and lower proportions may be advantageous under certain conditions. Particularly desirable results are obtained as in the above examples by the use of some 0.05 to 0.2 per cent calculated upon the above basis. Since increasing the proportion of the reagent naturally increases its effect upon the polymer formed, it is possible, by the use of large proportions, to obtain a product of extreme plasticity. The preferred range of 0.05 to 0.2 per cent, however, in general gives a product with a combination of properties most suitable for processing according to the methods used for natural rubber. Although large amounts of the diazo compounds sometimes retard polymerization, quantities within the preferred ranges often have a definite accelerating effect as illustrated by Example II.

The diazonium compound or substance used to form it is dissolved in either the polymerizable compound or in the aqueous phase according to its solubility. It is sometimes advantageous to add it in increments during the course of polymerization, particularly when the material which is active in influencing the polymerization is very unstable and may be largely decomposed before the polymerization is complete.

The present invention is, of course, not limited to the above examples, but can be practiced in any of the ways which have already been described in the prior art. Thus, such variations as the concentration and type of emulsifying agent and the ratio of aqueous to non-aqueous phase are not critical and can be varied in any known or obvious manner, although the conditions used in the above examples illustrate some of the preferred embodiments. Acid dispersions are preferred since the polymerization of the present invention is much more rapid in an acid medium. Likewise, the temperature of polymerization may be varied with effects already well known, 30° C. to 40° C. being suitable temperatures.

The same methods can be used for dispersing the polymerizable material in the emulsifying solution, for isolating the finished polymer from the dispersion, and for drying it and stabilizing it against oxidation, as have already been described for the preparation of other 1,3-butadiene and chloroprene polymers in aqueous dispersion. It is usually preferred to use a polymerization catalyst which is preferably a persulfate, but it can also be an inorganic or organic peroxide or a perborate or percarbonate or similar agent.

Suitable dienes for the practice of the invention are the conjugated butadiene hydrocarbons (such as 1,3-butadiene, isoprene, and 2,3-dimethyl-1,3-butadiene) and the haloprenes (such as chloroprene and bromoprene) or mixtures of two or more of these 1,3-dienes. It is often advantageous, particularly in the case of the 1,3-butadiene hydrocarbons, to polymerize in the presence of another polymerizable compound, which, in many cases, enters into chemical combination with the 1,3-diene. Preferred polymerizable compounds for this purpose are styrene, acrylic nitrile, methacrylic nitrile, vinylidene chloride, methyl vinyl ketone, the acrylic and methacrylic esters and similar compounds which themselves yield rubber-like interpolymers with 1,3-butadiene. However, the 1,3-diene should be the preponderant material; i. e., at least 50 per cent of the total polymerizable material.

The plastic rubber-like materials made according to the present invention may be compounded and cured by the usual prior art methods. They are particularly valuable where the product is to be used in contact with metals.

It is apparent that many widely different embodiments of this invention may be made without departing from the spirit and scope thereof, and, therefore, it is not intended to be limited except as indicated in the appended claims.

I claim:

1. Process for making a plastic synthetic rubber-like material which comprises polymerizing, in aqueous dispersion and in the presence of a member of the group consisting of diazonium salts and compounds capable of generating diazonium salts under the reaction conditions, a polymerizable material which is preponderantly a compound of the group consisting of polymerizable acyclic 1,3-diene hydrocarbons and their monohalogen derivatives.

2. Process for making a plastic synthetic rubber-like material which comprises polymerizing, in aqueous dispersion and in the presence of a member of the group consisting of diazonium salts and compounds capable of generating diazonium salts under the reaction conditions, a polymerizable material which is preponderantly 1,3-butadiene.

3. Process for making a plastic synthetic rubber-like material which comprises polymerizing, in aqueous dispersion and in the presence of a member of the group consisting of diazonium salts and compounds capable of generating diazonium salts under the reaction conditions, a polymerizable material which is preponderantly 2-chloro-1,3-butadiene.

4. Process for making a plastic synthetic rubber-like material which comprises polymerizing, in aqueous dispersion and in the presence of a member of the group consisting of diazonium salts and compounds capable of generating diazonium salts under the reaction conditions, a polymerizable material which is preponderantly 2-methyl-1,3-butadiene.

5. Process for making a plastic synthetic rubber-like material which comprises polymerizing, in aqueous dispersion and in the presence of a member of the group consisting of diazonium salts and compounds capable of generating diazonium salts under the reaction conditions, a compound of the group consisting of polymerizable acyclic 1,3-diene hydrocarbons and their mono-halogen derivatives.

6. Process for making a plastic synthetic rubber-like material which comprises polymerizing, in aqueous dispersion and in the presence of a member of the group consisting of diazonium salts and compounds capable of generating diazonium salts under the reaction conditions, 1,3-butadiene.

7. Process for making a plastic synthetic rubber-like material which comprises polymerizing, in aqueous dispersion and in the presence of a member of the group consisting of diazonium salts and compounds capable of generating diazonium salts under the reaction conditions, 2-chloro-1,3-butadiene.

8. Process for making a plastic synthetic rubber-like material which comprises polymerizing, in aqueous dispersion and in the presence of a member of the group consisting of diazonium salts and compounds capable of generating diazonium salts under the reaction conditions, 2-methyl-1,3-butadiene.

9. Process for making a plastic synthetic rubber-like material which comprises polymerizing, in aqueous dispersion and in the presence of from 0.05 to 0.2 per cent, calculated as $-N_2-$ group and based on the polymerizable material present, of a member of the group consisting of diazonium salts and compounds capable of generating diazonium salts under the reaction conditions, a polymerizable material which is preponderantly a compound of the group consisting of polymerizable acyclic 1,3-diene hydrocarbons and their mono-halogen derivatives.

10. Process for making a plastic synthetic rubber-like material which comprises polymerizing, in aqueous dispersion and in the presence of from 0.05 to 0.2 per cent, calculated as $-N_2-$ group and based on the polymerizable material present, of a member of the group consisting of diazonium salts and compounds capable of generating diazonium salts under the reaction conditions, a polymerizable material which is preponderantly 1,3-butadiene.

11. Process for making a plastic synthetic rubber-like material which comprises polymerizing, in aqueous dispersion and in the presence of from 0.05 to 0.2 per cent, calculated as $-N_2-$ group and based on the polymerizable material present, of a member of the group consisting of diazonium salts and compounds capable of generating diazonium salts under the reaction conditions, a polymerizable material which is preponderantly 2-chloro-1,3-butadiene.

12. Process for making a plastic synthetic rubber-like material which comprises polymerizing, in aqueous dispersion and in the presence of from 0.05 to 0.2 per cent, calculated as $-N_2-$ group and based on the polymerizable material present, of a member of the group consisting of diazonium salts and compounds capable of generating diazonium salts under the reaction conditions, a polymerizable material which is preponderantly 2-methyl-1,3-butadiene.

13. Process for making a plastic synthetic rubber-like material which comprises polymerizing, in aqueous dispersion and in the presence of from 0.05 to 0.2 per cent, calculated as $-N_2-$ group and based on the polymerizable material present, of a member of the group consisting of diazonium salts and compounds capable of generating diazonium salts under the reaction conditions, a compound of the group consisting of polymerizable acyclic 1,3-diene hydrocarbons and their mono-halogen derivatives.

14. Process for making a plastic synthetic rubber-like material which comprises polymerizing, in aqueous dispersion and in the presence of from 0.05 to 0.2 per cent, calculated as $-N_2-$ group and based on the polymerizable material present, of a member of the group consisting of diazonium salts and compounds capable of generating diazonium salts under the reaction conditions, 1,3-butadiene.

15. Process for making a plastic synthetic rubber-like material which comprises polymerizing, in aqueous dispersion and in the presence of from 0.05 to 0.2 per cent, calculated as $-N_2-$ group and based on the polymerizable material present, of a member of the group consisting of diazonium salts and compounds capable of generating diazonium salts under the reaction conditions, 2-chloro-1,3-butadiene.

16. Process for making a plastic synthetic rubber-like material which comprises polymerizing, in aqueous dispersion and in the presence of from 0.05 to 0.2 per cent, calculated as $-N_2-$ group and based on the polymerizable material present, of a member of the group consisting of diazonium salts and compounds capable of generating diazonium salts under the reaction conditions, 2-methyl-1,3-butadiene.

HERBERT W. WALKER.